INVENTORS.
William M. Smith
Chester C. Sarnecki
BY
Harvey M. Gillespie
Atty.

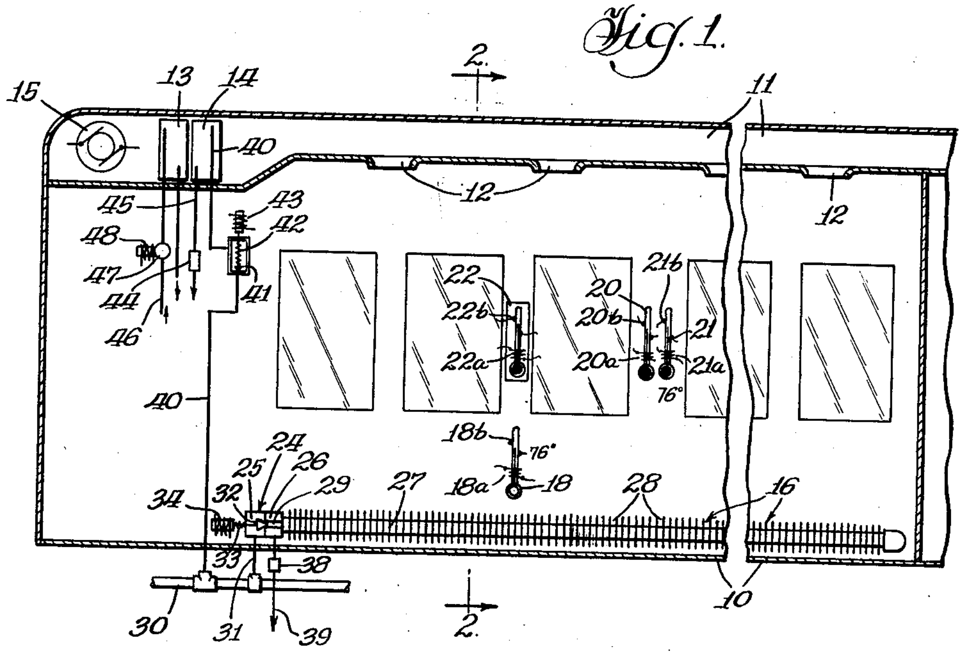
Fig. 1.
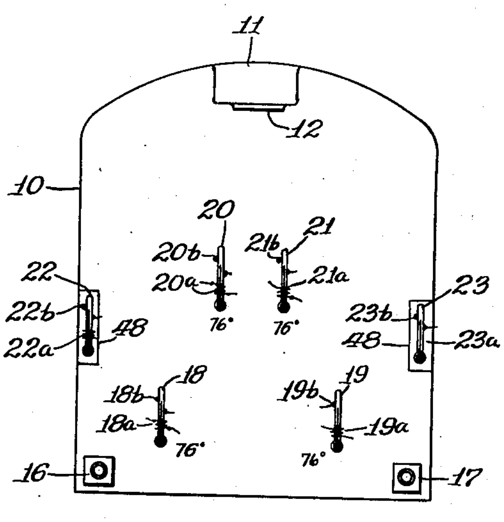
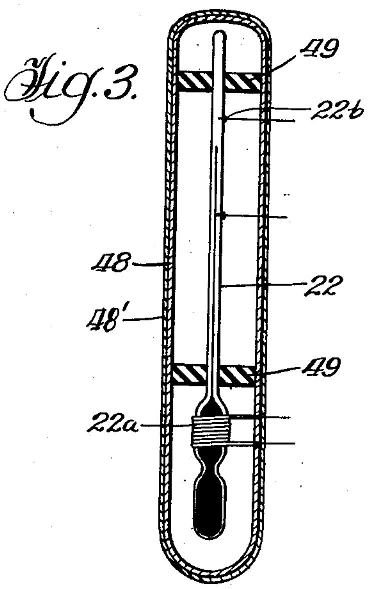
Fig. 3.
Fig. 2.
INVENTORS.
William M. Smith
Chester C. Sarnecki
BY
Harvey M. Gillespie
Atty.

Patented Aug. 10, 1954

2,686,043

UNITED STATES PATENT OFFICE 2,686,043

RADIANT HEAT ADJUSTMENT OF CONTROLS RESPONSIVE TO AMBIENT TEMPERATURE

William M. Smith, Glen Ellyn, and Chester C. Sarnecki, Chicago, Ill., assignors to Vapor Heating Corporation, Chicago, Ill., a corporation of Delaware Application November 28, 1950, Serial No. 197,913

9 Claims. (Cl. 257—3)

This invention relates to apparatus for controlling the temperature of an enclosed space and is directed particularly to an apparatus of this character in which the control elements which function to control the degree of heat added to or withdrawn from the enclosure during the heating and the cooling thereof, is automatically adjusted to compensate for any influence on the temperature of the space as a result of solar and other forms of radiant heat. The control elements are also, preferably, arranged so that the control elements for the portions of the enclosure which are most affected by the reception of radiant heat will receive the greatest corrective adjustment.

While the present invention is especially adapted and is described herein for use in controlling the heating of railway cars, it is to be understood that it is not limited thereto, but is applicable to many other forms of rooms, compartments and enclosures.

The system of controlling temperatures in a railway car, or in other enclosed spaces, on the basis of ambient temperature alone, while having certain advantages, fails to provide maximum comfort for the passengers or occupants of the space, since the thermostats used in such systems are constructed to respond only to the ambient temperature of the air within the enclosed space and do not respond to the effects of radiant heat. The present invention takes into consideration the fact that radiant heat plays an important part in providing a comfortable temperature within an enclosure, and that during the presence of higher radiant temperatures within an enclosure, lower ambient temperatures should be maintained therein. Also during the cooling of the space, the effect of radiant heat present within the space necessarily increases the cooling load imposed on the air cooling apparatus.

This invention accordingly comprises a control device including two kinds of thermostats, one affected by ambient air temperature and the other affected by radiant heat, these thermostats being cooperatively connected in control circuits for altering the effectiveness of the heating and cooling apparatus, whereby these apparatuses are controlled in response to temperatures which are equivalent to the combined effect of the ambient and the radiant heat. For example, during the night, when solar radiation is practically absent, a higher percentage of ambient heating will be required, but as the solar radiant heat increases to its maximum during the day time, the proportion of ambient heating is reduced so as to take advantage of the greater amount of solar heat penetrating through the roof, walls and windows of the enclosure. If the enclosure is relatively long and narrow, as in the case of a railway car, the solar radiant heat penetrating the walls and windows at one side affects the temperature at both sides of the car, but in different degrees. The invention provides a practical means of separately controlling heating equipment located at opposite sides of the car in relation to the temperature at that side and to also control other heating equipment and/or cooling equipment in relation to the net effect of the total amount of radiant heat influencing the temperature of the car.

A principal object of the present invention is to provide a new and improved temperature control means which will respond to the combined effects of both ambient and radiant heat. In this connection, the invention includes the provision of ambient temperature thermostats which have direct control of the heating and cooling apparatus and also includes radiant heat thermostats for automatically adjusting the temperature settings of the ambient temperature thermostats so as to control the operations of the heating and cooling apparatus in a manner to increase and decrease the efficiency of such apparatus in relation to the amount of radiant heat effect within the enclosure.

Another object is to provide improved arrangements and electrical connections whereby direct adjustments of the temperatures at different locations within the enclosure and in which the radiant heat responsive elements at different locations cooperate to collectively control the operation of other heating and/or cooling elements, whereby the latter elements are controlled in relation to the ambient and radiant temperatures of the enclosure as a whole.

Other objects and advantages of the invention will be apparent from the following description by reference to the accompanying drawings which show the now preferred means for carrying out our invention, in which drawings:

Fig. 1 is a diagrammatic view showing in outline the interior of one end portion of a railway car equipped with the improved apparatus, being substantially a vertical sectional view of said portion of the car.

Fig. 2 is a diagrammatic view, being substantially a vertical sectional view taken at the line 2—2 in Fig. 1.

Fig. 3 is a longitudinal sectional view through a radiant heat thermostat as used in the improved system.

Figure 4:
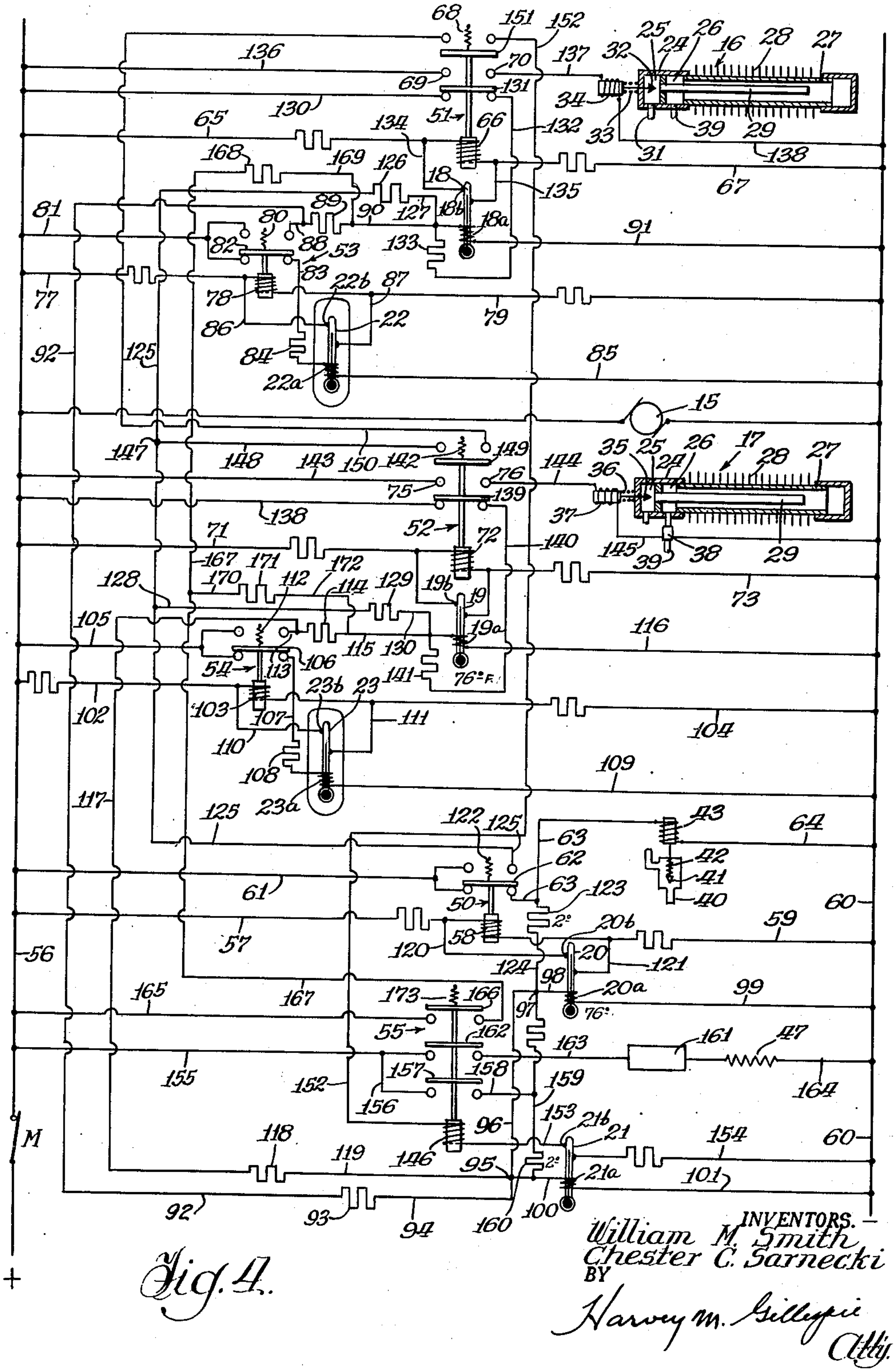
Fig. 4 is a diagrammatic view showing the preferred form of the circuits and connections by which the improved functions of the invention are carried out.

Referring now to the several figures of the drawings, 10 indicates a railway car having a duct 11 extending lengthwise of the car, with a series of openings 12 leading from the duct into the body of the car. An air cooling device 13 and an air heater 14 of any approved types are mounted in the duct 11 arranged for operation to maintain the air delivered into the enclosed space at suitable temperature. An electric fan 15 is provided for causing a circulation of air in heat exchange relation to the devices 13 and 14 for producing the desired effects on the air in the car.

In the lower portion of the car 10, there are steam radiators 16 and 17 at opposite sides, with the controls for the radiators so arranged that both of the radiators may be effective at the same time for adding heat to the car, or either of the radiators may be used alone to the exclusion of the other. Ambient air temperature thermostats 18 and 19 are provided in proximity to the radiators 16 and 17, respectively; ambient air temperature thermostats 20 and 21 are positioned to respond to the temperature of the enclosure as a whole and are employed for controlling the operation of the cooling device 13 and the air heater 14, respectively; and radiant heat thermostats 22 and 23 are provided at opposite sides of the car for adjusting the temperature settings of the control thermostats 18, 19, 20 and 21 in relation to the amount of radiant heat influenced at either side of the car. All of the thermostats are connected in circuits as shown in Fig. 4 as hereinafter specifically described for effecting the desired regulation of the various heating and cooling instrumentalities.

*Floor radiators*

The radiators 16 and 17 are, preferably, but not necessarily, of identical construction, each provided with a valve casing 24 formed with steam inlet and outlet chambers 25 and 26. An outer pipe 27 connects with the outlet chamber 26 and is closed at its outer end. It extends along the side of the car adjacent the floor thereof and is provided on its outer surface with heat radiating fins 28. A smaller pipe 29 is arranged within the outer pipe 27 and leads from the inlet chamber 25 of the valve casing 24 to a location near the closed outer end of pipe 28. The steam train pipe 30, having connection with a suitable source of steam, is connected by means of supply branches 31 to both of the radiators. The admission of steam to the radiator 16 is controlled by a valve 32 which is opened by means of a spring 33 and is closed by the energized operation of a solenoid 34 against the compression of said spring. The admission of steam to the radiator 17 is controlled by a similar valve 35 which is likewise opened by a spring 36 and closed by the energized operation of a solenoid 37.

It will be observed by inspection of Figs. 1 and 4 of the drawing, that when the solenoid admission valve of either radiator 16 or 17 is open, the steam delivered into the inlet chamber 25 of the valve casing 24 will flow through the inner pipe 29 into the outer pipe 28 near its closed end. The said steam then flows through the outer pipe to the outlet chamber 26 of the valve chamber 24. The steam is retained in the radiator, but the condensation is permitted to discharge from the system. For convenience of illustration, a steam trap 38 may be connected in the outlet pipe 39 leading from the radiator.

*Air heater*

The air heater 14 receives its steam from the train pipe 30 through a branch supply pipe 40. The admission of steam to the air heater is controlled by an admission valve 41 which is normally closed by a spring 42 and is opened by the energized operation of a solenoid 43 against the compression of spring 42. The condensation may be discharged through a suitable steam trap 44 communicating with an outlet pipe 45.

*Air cooler*

The air cooler 13, as previously indicated, may be of any suitable construction and receives a coolant, either liquid or gas, through a supply pipe 46 which leads from a conventional pumping and/or compressor mechanism (not shown). The admission of coolant to the air cooler 13 is controlled by a normally closed valve 47 which is opened by the energization of a solenoid 48.

*Ambient temperature thermostats*

Each of the ambient temperature thermostats 18, 19, 20 and 21 are shown, for convenience of illustration, as being of the mercury column type provided in each case with an electrical auxiliary heater adapted to apply variable amounts of auxiliary heat to their associated thermostats. The auxiliary heaters for the several heat control thermostats 18, 19 and 20 are designated $18^a$, $19^a$ and $20^a$, respectively. The auxiliary heater for the cooler control thermostat 21 is designated $21^a$. These thermostats are provided in each case with spaced apart contacts which are cooperatively connected in the control circuits hereinafter described for controlling the effectiveness of radiators 16, 17, the air heater 14, and the air cooler 13. One contact for each thermostat is positioned to engage the mercury columns at all times, but the other contact is normally out of contact with the mercury column. These contacts of the respective thermostats 18, 19, 20 and 21 are designated $18^b$, $19^b$, $20^b$ and $21^b$.

*Radiant heat thermostat*

The radiant heat thermostats 22 and 23 (shown best in Fig. 3) are of the mercury column type and include, in each case, a double bulb capillary tube for containing the mercury. The thermostat 22 is provided with an electrical heater $22^a$ surrounding one bulb and the thermostat 23 is provided with a similar electrical heater $23^a$. Both of these thermostats are provided, respectively, with upper and lower contacts $22^b$ and $23^b$ spaced from other contacts having constant engagement with the mercury column and cooperate therewith to close electrical circuits when the mercury columns move into engagement with contacts $22^b$ and $23^b$. The capillary tubes of the radiant heat thermostats are enclosed in evacuated glass envelopes 48, being secured in such envelopes by means of discs 49 made of material having a low coefficient of heat conductivity, for example rubber. Substantially complete vacuums are maintained in the glass envelopes 48 so that the mercury columns of the thermostat tubes enclosed therein will not be affected by the ambient air temperature of the space whose temperature is being controlled. The said glass envelopes, however, may be and preferably are coated with lamp black 48′ so as to increase their absorption of radiant heat. By reason of the above construction, the thermostats 22 and 23 respond only to radiant heat transmitted through the evacuated space within the envelopes and the heat generated by the electrical heaters 22[a], 23[a].

*Thermostat and relay combinations*

Each of the six thermostats shown control the energization of an associated relay. The thermostat 20 controls the energization of a relay 50, which relay opens and closes several circuits including an energizing circuit through the solenoid 43 of the admission valve 41 for controlling the admission of steam to the air heater 14. The thermostat 18 controls the energization of relay 51 which relay opens and closes several circuits including a circuit through solenoid 34 of admission valve 32 for controlling the admission of steam to the floor radiator 16. The thermostat 19 is connected in a shunt circuit and controls the energization of relay 52 which opens and closes several circuits including an energizing circuit through solenoid 37 of steam admission valve 35 for floor radiator 17. The thermostat 21 controls a relay 55 which opens and closes several circuits including an energizing circuit for the cooling mechanism including the coolant valve 47. The radiant heat thermostat 22 controls its associated relay 53 for opening and closing an electric circuit through the auxiliary heater 22[a] for the purpose of cycling the said thermostat 22 and also opens and closes circuits through the electrical heaters 18[a], 20[a] and 21[a] for the purpose of adjusting the temperature settings of the ambient temperature thermostats 18, 20 and 21. The radiant heat thermostat 23 operates in a like manner to control its associated relay 54 for opening and closing an electric circuit through the auxiliary heater 23[a] for the purpose of cycling the said thermostat 23 and also opens and closes electric circuits through the auxiliary heaters 19[a], 20[a] and 21[a] for the purpose of adjusting the temperature settings of the ambient temperature thermostats 19, 20 and 21. It will be seen, therefore, that, while the radiant heat thermostats will function individually to adjust the temperature settings of the ambient temperature thermostats 18 and 19, they will function both individually and collectively to bring about the closing of heating circuits through the auxiliary heaters 20[a] and 21[a] of the overhead heating and cooling thermostats 20 and 21 to adjust their temperature settings.

*Control circuits and temperature setting of thermostats*

The manner in which the ambient temperature thermostats 18, 19, 20 and 21 are adjusted to their normal temperature settings and the manner in which these normal temperature settings are further adjusted to compensate for the presence of radiant heat, will be best understood in connection with the description of the control circuits shown in Fig. 4 of the drawings. For the purpose of the description of the circuit diagram, let it be assumed that the temperature within the space being controlled, for example a railway passenger car, is below the temperature settings of the said ambient thermostats 18, 19, 20 and 21 and that for the present there is no radiant temperature influencing the functions of the radiant thermostats 22 and 23. Upon the closing of the main switch M, energizing circuits are closed through the relays 50, 51 and 52 for the purpose of energizing the heating apparatus and through relays 53 and 54 for the purpose of adding heat to the several ambient thermostats. The energizing circuit for relay 50 leads from the positive line 56 through wire 57, solenoid 58 of relay 50 and thence through wire 59 to negative line 60. This circuit energizes the relay 50 and closes an energizing circuit through the solenoid 43 to open the valve 41 of the overhead heater 10 and thereby adds heat to the air being delivered into the car by means of blower 15. The valve energizing circuit leads from positive line 56 through wire 61, contact 62 of relay 50, wire 63 through solenoid 43 and thence through lead 64 to the negative line. The circuit for energizing solenoid 66 leads from positive line 56 through lead 65, solenoid 66 of relay 51, thence through wire 67 to the negative line 60. The energization of this relay moves its contacts against the tension of spring 68 to a position for opening the circuit through contacts 69—70 and thereby opens the circuit through valve solenoid 34 so as to permit the valve spring 30 to open the valve 32 and thereby admit steam to the radiator 16. The circuit for energizing the relay 52 leads from positive line 56 through lead 71, solenoid 72 of relay 52 and thence through lead 73 to the negative line 60. The said energization of relay 52 moves its contacts against the tension of spring 74 to a position to open the contacts 75 and 76 and thereby open the normally closed circuit through the solenoid 37, whereupon the valve spring 36 is effective to open the valve 35 and thereby admit steam to the floor radiator 17.

The energizing circuit for relay 53 leads from positive line 56 through lead 77, through solenoid 78 of said relay 53 and thence through lead 79 to the negative line 60. The energization of solenoid 78 moves the relay 53 against the tension of spring 80 to a position to close an energizing circuit through the auxiliary heater 22[a] of the radiant heat thermostat 22. This circuit leads from positive line 56 through conductor 81, energized closed contact 82 of relay 53 and conductor 83 and resistor 84 through electrical heater 22[a] and thence through lead 85 to the negative line 60. The electrical current supplied to the auxiliary heater 22[a] through the said resistor 84 is sufficient to cause the mercury column of thermostat 22 to engage its upper contact 22[b]. This functioning of thermostat 22 closes a shunt circuit leading from wire 77 through wire 86 to the upper contact 22[b] of thermostat 22, thence through the mercury column of the thermostat and wires 87 and 79 to the negative line. This last described circuit shunts out the solenoid 78 and thereby releases the relay 53. The relay is, therefore, moved by the tension of spring 80 to a position to close a circuit through auxiliary heater 18[a] of the ambient temperature thermostat 18. This circuit includes the positive line 56, lead 81 and de-energized contact 82 of relay 53, wire 88, resistor 89, wire 90 through the auxiliary heater 18[a] and thence through wire 91 to the negative line. As soon as the electrical heating circuit for auxiliary heater 22[a] is broken the mercury column of thermostat 22 recedes from its engagement with contact 22[b] and thereby again effects re-energization of the solenoid 78 to move the relay to the position indicated in Fig. 4. It will be seen, therefore, that the relay 53 will be cycled continuously during the operation of the control system and that electrical heat is alternately applied to the auxiliary heater 18a of thermostat 18 and auxiliary heater 22a of thermostat 22. The resistors 84 and 89 are so proportioned that, assuming that the relay 53 is de-energized 50% of the time, there will be electrical current passed through resistor 89 in sufficient volume to maintain the mercury column of thermostat 18 in contact with upper contact 18b thereof when the temperature of the space stands at 76° F. It will be observed, therefore, that when the radiant heat thermostat 22 is subjected to the influence of radiant heat, it will accelerate the cycling of its associated relay 53 and thereby increase the percentage of time that it is de-energized and, therefor, proportionately increase the total amount of electrical energy delivered to the auxiliary heater 18. For example, let it be assumed that the thermostat 22 and its relay 53 are normally cycled so that the relay is de-energized 50% of the time. If the radiant heat thermostat receives 1% of radiant heat, the cycling operation of the relay 53 will be accelerated whereby it will be de-energized 51% of the time and thereby add 1% more auxiliary heat to the auxiliary heater 18a to proportionately reduce the temperature setting of thermostat 18, so as to compensate for the amount of radiant heat affecting the temperature of the enclosed space.

The cycling of relay 53, in addition to adjusting the temperature setting of thermostat 18, also adjusts the temperature setting of thermostats 20 and 21. Consequently, when relay 53 is de-energized it closes an energizing circuit through the auxiliary heater 20a of thermostat 20 and through auxiliary heater 21a of thermostat 21. This circuit includes the positive line 56, wire 81, de-energized contact 82 of relay 53, wire 88 and wire 92 through resistor 93, wire 94 to junction 95. At this point, one-half of the current will flow through wires 96 to junction 97 and thence through wire 98, heating coil 20a and wire 99 to the negative line. The other one-half of the current will pass through wire 100, through auxiliary heater 21a and wire 101 to the negative side of the line. The value of resistor 93 has the same value as resistor 89, but inasmuch as the current passing through resistor 93 is divided between the auxiliary heaters 20a and 21a, the cycling operations of the relay 53 affect only one-half of the required adjustment of the thermostats 20 and 21. The other half of the required adjustment is effected through relay 54 under the control of the radiant heat thermostat 23.

The said relay 54 is energized by a circuit leading from positive line 56 through lead 102 through solenoid 103 of relay 54 and line 104 to the negative line 60. The energization of said relay 54 closes a momentary circuit through the auxiliary heater 23a of thermostat 23. This circuit includes the positive line 56, lead 105, energized closed contact 106 of relay 54, lead 107, cycle resistor 108, auxiliary heater 23a and lead 109 to the negative line. The closing of the last mentioned circuit adds sufficient heat to the thermostat 23 and causes the mercury column to engage the upper contact 23b thereof, thereby closing a shunt circuit around the solenoid 103. The shunt circuit leads from wire 102 through wire 110 to the upper contact 23b of thermostat 23 and thence through wires 111 and 104 to the negative line. The closing of the shunt circuit de-energizes the relay 54 whereby its contact 106 is moved by the tension of spring 112 into a position to close a circuit through the auxiliary heater 19a of thermostat 19. This circuit includes the wire 105, de-energized closed contact 106 of relay 54, wire 113, resistor 114 and wire 115 through the auxiliary heater 19a and thence through wire 116 to the negative line. The thermostat 23 and relay 54 are designed to cycle continuously during the operation of the control system and the values of resistors 108 and 114 correspond to the values of resistors 84 and 89 so that the same amount of electrical current is supplied to the auxiliary heater 19a as is supplied to the auxiliary heater 18a. In this way, both thermostats 18 and 19 are set, in the absence of radiant heat, to function at the same temperature setting, but the temperature settings may be varied, as will be hereinafter described, if the radiant heat influencing the temperature of an enclosed space has a disproportionate effect on the thermostats 22 and 23. For example, assuming that relay 54, in the absence of any influence of radiant heat on the thermostat 23, will cycle so as to be de-energized 50% of the time. It will be observed that, if the said thermostat 23 is then influenced by two or more per cent of radiant heat, the cycling rate of the relay will be altered so that it will remain closed 52% of the time and thereby more auxiliary heat will be applied to the auxiliary heater 19a than is applied to the auxiliary heater 18a. Consequently, the thermostat 19 will close at its contact 19b at a lower temperature than thermostat 18 and the delivery of steam to the radiator 17 will be proportionately reduced.

The de-energization of relay 54, like the de-energization of relay 53, closes a circuit for applying additional heat to the auxiliary heaters 20a and 21a. This circuit leads from wire 113 through wire 117, through resistor 118 and wire 119 to the junction 95 of said wire 119 with wires 94 and 96. The electrical current passing through the wire 119 is, therefore, directed one-half through wire 96 to junction 97 and wire 98 to the auxiliary heater 20a and thence through wire 99 to the negative line 60 and the other half is directed through wire 100, auxiliary heater 21a and wire 101 to the negative line. It will be seen, however, that, under the assumed condition, the thermostats 20 and 21 are adusted to compensate for the 1½% of radiant heat and that this adjustment is slightly greater than the adjustment of thermostat 18 and slightly less than the adjustment of thermostat 19, the total adjustment of each thermostat 20, 21 being one-half the collective adjustments of thermostats 18 and 19.

Returning now to the relays 50, 51 and 52 and the ambient temperature thermostats controlling them: As previously indicated, the steam will be supplied to the overhead heater 14, the floor radiator 16 and the floor radiator 17 until the thermostats 20, 18 and 19, respectively, are satisfied. It will be observed that each of the thermostats 20, 18 and 19 are connected in shunt circuits around the solenoid of their respective relays. The shunt circuit connected through the thermostat 20 leads from wire 57 through wire 120 to the upper contact 20b of thermostat 20, thence through the mercury column and wires 121 and 59 to the negative line. When the last mentioned shunt circuit is closed a spring 122 moves the contact of relay 50 to a position to open the circuit through the solenoid 43 of valve 41 so as to permit the valve to close under the pressure of spring 42 and thereby shut off the delivery of heat to the overhead heater 14. Each time the relay 50 is energized to open the valve 41, it also closes a circuit for applying additional heat to the auxiliary heater 20a. This circuit leads from the energized closed contact 62 through wire 63, resistor 123, wire 124 to junction 97 and thence through wire 98 to auxiliary heater 20a and through wire 99 to the negative line. The resistor 123 has a value of 2° of heat. Consequently, the thermostat 20 will close at 2° below the adjusted setting. However, as soon as the mercury column of the thermostat engages the upper contact 20b the solenoid 58 of relay 50 is shunted out of its energizing circuit and the relay is opened by the spring 122, thereby breaking the 2° heating circuit through resistor 123. The thermostat 20 and relay 50 will cycle until the temperature of the room plus the auxiliary heat adjustment is sufficient to maintain the mercury column engaged with the upper contact 20b. Each time the thermostat 20 is satisfied the de-energization of its associated relay 50 closes circuits for applying additional heat to the auxiliary heaters of both thermostats 18 and 19 so as to cause them to close their contacts and consequently shut off the delivery of heat to the radiators 16 and 17. It will be observed, therefore, that the circuits are such that steam can be delivered to the floor radiators 16 and 17 only when the heater 14 is operating. The last mentioned heating circuit for the auxiliary heater 18a leads from the de-energized contact 62 of relay 50 through wire 125 through resistor 126 and wires 127 and 90 to the auxiliary heater 18a and thence through wire 91 to the negative line. The similar heating circuit for thermostat 19 leads from wire 125 through wire 128, resistor 129 and wires 130 and 115 through the auxiliary heater 19a, thence through wire 116 to the negative line. Both of the thermostats 18 and 19 are cycled through their associated relays by means of electrical circuits which are effective only during the period that steam is being admitted to the floor radiators 16, 17. The last mentioned heater circuit for thermostat 18 leads from the positive line 56 through wire 130, energized closed contact 131 of relay 51, wire 132, resistor 133 and by wire 90 through the auxiliary heater 18a and wire 91 to the negative line. The resistor 133 has a heating value of 2°. Consequently, the thermostat 18 will close momentarily at a temperature of 2° below its adjusted functional setting. When this thermostat is closed it makes a shunt circuit around the solenoid 66 of relay 51 effective to de-energize the relay. This shunt circuit includes positive line 56, wire 65, wire 134 to the upper contact 18b of thermostat 18, thence through the mercury column and wire 135 to wire 67 and negative line 60. The deenergized of relay 51 closes an energizing circuit through the solenoid 34 of admission valve 32 so as to close the valve against the pressure of spring 33. This energizing circuit leads from the positive line 56 through wire 136 through de-energized closed contact 131, wire 137, solenoid 34 and wire 138 to the negative line 60. It will be observed, therefore, that the valve 32 of radiator 16 can be opened and closed independently of the control of the thermostat 20 providing that the thermostat 20 is calling for heat. However, when the thermostat 20 is satisfied the heating current passed through the resistor 126 will enforce immediate closing of thermostat 18.

The thermostat 19 is cycled by means of a similar circuit which is closed through relay 52 when it is energized closed. This circuit leads from positive line 56 through wire 138, energized closed contact 139 of relay 52, wire 140 and resistor 141. This resistor, like the resistor 133, has a value of 2° so as to apply the equivalent of 2° of auxiliary heat to thermostat 19 each time that the relay contact 139 is closed. When the relay 52 is de-energized the spring 142 leads the relay to a position to close contact 76, thereby establishing a circuit to energize the solenoid 37 and thereby close the admission valve 35 against the compression of spring 36 to shut off steam from radiator 17. This energizing circuit leads from positive line 56 through wire 143 through de-energized contact 139 and wire 144, solenoid 37 and thence through wire 145 to the negative line 60.

*Cooling*

The cooling control thermostat 21, as previously described, has its temperature setting automatically adjusted by means of the radiant heat thermostats 22 and 23 and their associated cycling relays in the same manner and simultaneously with the adjustment of the overhead heat thermostat 20, except that the thermostat 21 is not cycled by the heating current passed through the cycle resistor 123. However, when the temperature of the enclosed space, together with the auxiliary heat applied to thermostat 20, is sufficient to maintain it closed at its upper contact, the cooling control thermostat 21, being subject to the same adjustment and temperature influences, is also closed. When this condition occurs, the relays 51 and 52 will also be de-energized closed by reason of the additional heating current delivered through the resistors 126 and 129 to the auxiliary heaters 18a and 19a, respectively. Consequently, an energizing circuit is closed through the solenoid 146 of the cooling relay 55. This energizing circuit leads from positive line 56 through wire 61, de-energized closed contact 62 of relay 50, wire 125 to its junction 147 with a wire 148, thence through de-energized closed contact 149 of relay 52, wire 150, de-energized closed contact 151 of relay 51, wire 152, solenoid 146 of relay 55, wire 153, upper contact 21b of thermostat 21 and thence through the mercury column and wire 154 to the negative line 60. The energization of relay 146 closes a circuit for applying 2° of additional heat to thermostat 21 and thereby adjust the temperature setting of thermostat 21 to a position 2° below its normal or initial setting. This heating circuit leads from positive line 56 through wire 155 and 156 to energized closed contact 157 of relay 55, wires 158 and 159 through 2° resistor 160 and thence through wire 100, auxiliary heater 21a and wire 101 to the negative line. With this circuit closed the thermostat 21 will remain closed until the temperature within the enclosed space is definitely lowered to a temperature 2° below the heating control thermostats and thereby avoids recurrent operation of the heating and cooling mechanism at a time when one would be opposing the other. The energization of the relay 55 also closes a circuit through the cooling mechanism 161. This circuit includes the positive line 56, leads 155, energized closed contact 162, lead 163, cooling mechanism 161, solenoid 47, for controlling the admission of coolant to the cooler 13 and thence through wire 164 to the negative line 60. The energization of said relay 55 also closes a circuit for applying additional heat to the auxiliary heaters of the floor radiator control thermostats 18 and 19. This circuit through the auxiliary heater 18a of thermostat 18 includes a positive line 56, wire 165, energized closed contact 166 of relay 55, wire 167, resistor 168 and wires 169 and 90 to the auxiliary heater 18a and thence through wire 91 to the negative line. Similar lock-out circuits are closed through the auxiliary heater 19a and 20a. The circuit for heater 19a leads from the wire 167 through wire 170, resistor 171 and wires 172 and 115 through the auxiliary heater 19a and wire 116 to the negative line 60. The circuit for heater 20a leads from closed contact 157 of relay 55, wire 158, 174, resistor 175 and wire 98 to heater 20a. The resistors 168, 171 and 175 may be of any desired value for applying sufficient heat to the auxiliary heaters 18a, 19a and 20a to insure that all heat delivery means will remain ineffective during the cooling function of the system.

It will be observed that when the volume of radiant heat influencing the thermostats 22 and 23 increases or decreases, during the cooling function of the system, the functional setting of the thermostat 21 is correspondingly increased or decreased to compensate for the radiant heat influenced. That is to say, as the volume of radiant heat increases, the heat applied to the auxiliary heater 21a of thermostat 21 increases. Consequently, the thermostat 21 will not break contact until the temperature of the car has declined to a point where the admission of heat to the interior of the car is desired. When the thermostat 21 breaks contact the spring 173 will move the relay 55 to open all of its contacts and thereby condition the system for redelivery of heat into the enclosed space.

We claim:

1. A temperature control system comprising, in combination, an apparatus for altering the temperature of an enclosed space, electrically energized means for controlling the delivery of temperature altering medium to said apparatus, means including a thermostat responsive to the ambient temperature of the enclosed space for exclusively controlling the energization of said electrically energized means, an electrical heater for applying auxiliary heat to said thermostat to adjust its temperature setting, and means including a thermostat insulated against conductive transmission of heat thereto from the air within the enclosed space but responsive to radiant heat therein for controlling the energization of said electrical heater, whereby the temperature setting of said ambient temperature thermostat is adjusted in relation to the radiant heat component affecting the temperature of the enclosure.

2. A temperature control system comprising, in combination, an apparatus for altering the temperature of an enclosed space, electrically energized valve means for controlling the delivery of temperature altering medium to said apparatus, means including a thermostat responsive to the ambient temperature of the enclosed space for exclusively controlling the energization of said valve means, an electrical heater for applying auxiliary heat to said thermostat to adjust its temperature setting, and means including a thermostat insulated against conductive transmission of heat thereto from the air within the enclosed space but responsive to radiant heat therein for controlling the energization of said electrical heater, whereby the temperature setting of said ambient temperature thermostat is adjusted in relation to the radiant heat component affecting the temperature of the enclosure.

3. A temperature control system comprising, in combination, an apparatus for altering the temperature of an enclosed space, electrically energized valve means for controlling the delivery of temperature altering medium to said apparatus, means including a thermostat responsive to the ambient temperature of the enclosed space for exclusively controlling the energization of said valve means, an electrical heater for applying auxiliary heat to said thermostat to adjust its temperature setting, a plurality of electrical circuits for energizing said electrical heater, and means including a thermostat insulated against conductive transmission of heat thereto from the air within said enclosed space but responsive to radiant heat therein for controlling the energization of one of said circuits, whereby the temperature setting of said ambient temperature thermostat is adjusted in relation to the radiant heat component affecting the temperature of the enclosure.

4. A temperature control system comprising, in combination, an apparatus for altering the temperature of an enclosed space, electrically energized valve means for controlling the delivery of temperature altering medium to said apparatus, means including a thermostat responsive to the ambient temperature of the enclosed space for exclusively controlling the energization of said valve means, an electrical heater for applying auxiliary heat to said thermostat to adjust its temperature setting, two electrical circuits for energizing said electrical heater, and means including separate thermostats insulated against conductive transmission of heat thereto from the air within the enclosed space but responsive to radiant heat therein for controlling the energization of each of said circuits, whereby the ambient temperature thermostat is adjusted in relation to the radiant heat component affecting the temperature at different parts of the enclosure.

5. A temperature control system comprising, in combination, an apparatus for altering the temperature of an enclosed space, electrically energized means for controlling the delivery of a temperature altering medium to said apparatus, means including a thermostat responsive to the ambient temperature of the enclosure for exclusively controlling the energization of said electrically energized means, an electrical heater for applying heat to said ambient temperature thermostat, means for intermittently opening and closing an energizing circuit through said electrical heater to adjust the temperature setting of said ambient temperature thermostat insulated against conductive transmission of temperature from the air within the enclosed space but responsive to the radiant heat therein comprising a second thermostat and a relay controlled thereby for opening and closing an electrical circuit through the electrical heater for said ambient temperature thermostat, means defining an energizing circuit connected through the relay controlled by said radiant heat thermostat to effect continuous cycling thereof during the operation of the system; whereby the rate of its cycling operation being varied in relation to the volume of radiant heat present to adjust the temperature setting of the said ambient thermostat to compensate for the amount of radiant heat.

6. A temperature control system as specified in claim 1, in which said means for delivering current to said electrical heater comprises two separate circuits connected with the electrical heater in parallel relationship to each other, and in which one of said circuits is conditioned for effective operation independently of radiant heat effects and the other of said circuits is conditioned for effective operation by the influence of radiant heat effects.

7. A temperature control system comprising, in combination, an apparatus for altering the temperature of an enclosed spaced and including an air heater and an air cooler, means including a first thermostat responsive to the ambient temperature of the space and a relay controlled by said first thermostat for exclusively controlling the operation of the air heater, means including a second thermostat responsive to the ambient temperature within the space and a relay controlled by the second thermostat for controlling the operation of the air cooler, separate electrical heaters for applying auxiliary heat to said thermostats to adjust the temperature setting, and means for controlling the energization of said electrical heaters comprising a plurality of thermostats insulated against conductive transmission of temperature thereto from the air within the enclosed space but responsive to the radiant heat at different locations within the enclosed space, separate relays controlled by the radiant heat thermostats, separate electrical heaters for applying heat to the radiant heat thermostats and connected through the relay associated with its thermostat so as to effect continuous cycling operation thereof in a predetermined rate, in the absence of radiant heat effect, whereby the rate of cycling thereof is accelerated in relation to the effect of radiant heat present adjacent each radiant heat thermostat, means defining electrical circuits connected in said relation in parallel relation to each other, each said circuit having parallel branches connected through both electrical heaters, whereby both said heaters are adjusted in relation to the radiant heat effect at each of the several radiant heat thermostats.

8. A temperature control system comprising, in combination, a plurality of radiators located in spaced zones within an enclosed space and an air heater for delivering heated air into the entire space, separate means for controlling the operations of the individual radiators and said air heater including, in each case, an ambient temperature thermostat responsive to the temperature of the enclosed space, separate means including thermostats insulated against conductive transmission of temperature thereto from the air within the enclosed space but responsive to the radiant heat therein and relays controlled by the radiant heat thermostats for adjusting the temperature settings of the ambient temperature thermostats associated with said radiators in relation to the amount of radiant heat effect within the zones of the space served by the respective radiators; the several means for adjusting the ambient temperature thermostats associated with the several radiators being both individually and collectively operable to adjust the temperature setting of the air heater thermostat in relation to the radiant heat effect within the enclosure.

9. A temperature control system comprising, in combination, a plurality of radiators located in spaced zones within an enclosed space and an air heater for delivering heated air into the entire space, separate means for controlling the operations of the individual radiators and said air heater including, in each case, an ambient temperature thermostat responsive to the temperature of the enclosed space, separate electrical heaters for the several ambient temperature thermostats, separate means including radiant heat thermostats and relays controlled thereby for opening and closing electrical circuits through the electrical heaters of the ambient temperature thermostats associated with said radiators so as to adjust their temperature settings in supplying electrical current to the electrical heaters associated with said radiators being provided with circuit means for directing heating current to the electrical heater of the thermostat associated with the air heater in relation to the amount of radiant heat effect within the zones of the space served by the respective radiators; the several means for adjusting the ambient temperature thermostats associated with the several radiators being both individually and collectively operable to adjust the temperature setting of the air heater thermostat in relation to the radiant heat effect within the enclosure.

References Cited in the file of this patent

UNITED STATES PATENTS

| Number | Name | Date |
|---|---|---|
| 2,083,317 | Dallenback | June 8 ,1937 |
| 2,346,592 | Lehane | Apr. 11, 1944 |
| 2,451,566 | Lehane | Oct. 19, 1948 |
| 2,478,588 | Lehane | Aug. 9, 1949 |
| 2,509,607 | Mussen | May 30, 1950 |
| 2,548,983 | Klug | Apr. 17, 1951 |
| 2,556,065 | Callender | June 5, 1951 |